William H. Noble's Apparatus for preventing Curculio...
73458
PATENTED
JAN 21 1868
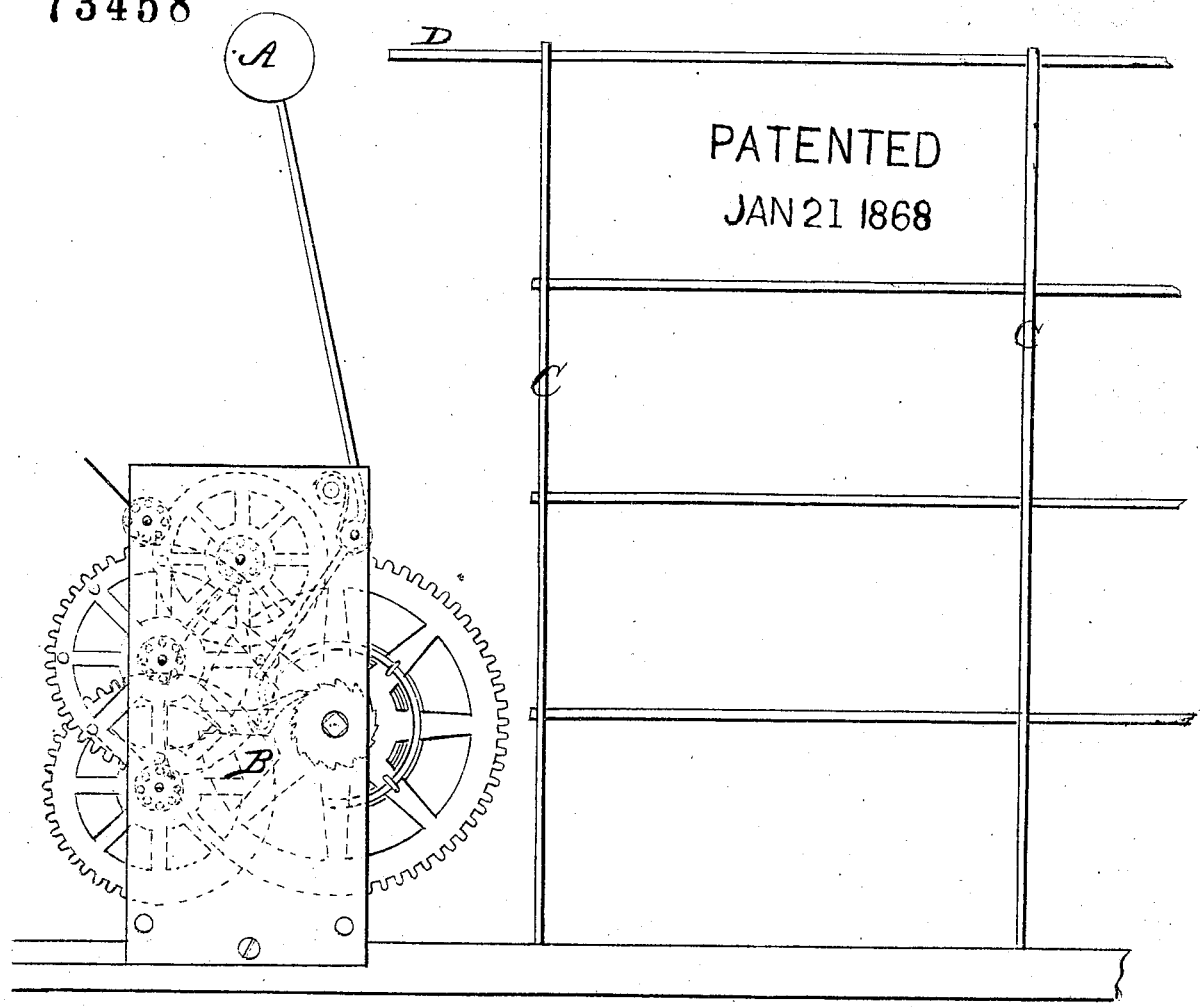
Witnesses
John H. Shumway
A. J. Tibbits
William H. Wills
Inventor
By his Attorney
John E. Earle

UNITED STATES PATENT OFFICE.

WILLIAM H. NOBLE, OF BRIDGEPORT, CONNECTICUT.

IMPROVEMENT IN APPARATUS FOR PREVENTING THE CURCULIO FROM ASCENDING FRUIT-TREES.

Specification forming part of Letters Patent No. 73,458, dated January 21, 1868.

*To all whom it may concern:*

Be it known that I, WILLIAM H. NOBLE, of Bridgeport, in the county of Fairfield and State of Connecticut, have invented a new Apparatus for Preventing the Curculio on Fruit-Trees, Vines, &c.; and I do hereby declare the following, when taken in connection with the accompanying drawing, and the letters of reference marked thereon, to be a full, clear, and exact description of the same, and which said drawing constitutes part of this specification, and represents a side view of the apparatus.

This invention is designed to prevent the ascent of or to drive the curculio from fruit-trees, vines, &c. It needs not that I should say anything to show the importance of preventing this insect from its attack upon fruit-trees. This is too well known to all experienced in horticulture, and many devices have been practiced to destroy or prevent the insect. It has been found, by practice, that a slight jar upon the tree or vine causes the curculio to let go its hold and fall to the ground. It is well known to horticulturists that the curculio is very timid, and to this weakness I attribute the effect of the slight jar upon the tree, as the jar requires to be only so heavy as will simply give the slightest shock, and scarcely perceptible to the person, to cause the insect to fall to the ground.

My invention consists in the arrangement of an automatic hammer, in such relative position to the tree or vine which it is designed to protect, that the hammer may so strike the tree or vine, or rods or frame attached thereto, as to give the slight shock required.

In order to the clear understanding of my invention, I will proceed to describe the same as illustrated in the accompanying drawing. I have represented my invention as applied to a training-frame for vines, but is applied to trees in like manner.

A is a hammer, arranged in connection with a clock-work, B, so that the hammer is caused to vibrate as often as may be expedient, and should be from ten to fifteen blows per minute, and this is arranged in such relative position to the frame C that the hammer may strike some point on the frame, preferring the upper bar D, inasmuch as the higher up the blow is struck the lighter may be the blow to produce the same effect. The clock-work set in motion, by winding or otherwise, causes the hammer to strike the bar D, and, through the blows constantly given, the jarring effect is constantly kept up; and, when so continued, the curculio will not ascend, or, if ascending, will drop to the ground, where it may be destroyed in any convenient manner.

For vines a single apparatus may be sufficient for a long frame; but for trees one apparatus should be attached directly to the tree, and I prefer that it be so attached at some little distance above the roots; or several trees may be attached to rods, so that a single apparatus may answer the purpose for many trees.

Having thus fully described my invention, what I claim as new and useful, and desire to secure by Letters Patent, is—

The arrangement of a hammer, operating automatically, in such relative position to trees or vines that the blow of the hammer may communicate a jar thereto, substantially as and for the purpose herein set forth.

WM. H. NOBLE.

Witnesses:
JOHN E. EARLE,
A. J. TIBBITS.